US010854860B2

(12) United States Patent  
Yamane et al.

(10) Patent No.: US 10,854,860 B2  
(45) Date of Patent: Dec. 1, 2020

(54) INTER-BATTERY CONNECTION DEVICE AND INTER-BATTERY CONNECTION DEVICE ASSEMBLY

(71) Applicant: Tyco Electronics Japan G.K., Kanagawa (JP)

(72) Inventors: Tomokazu Yamane, Kanagawa (JP); Hiroki Kondo, Kanagawa (JP)

(73) Assignee: Tyco Electronics Japan G.K., Kanagawa (JP)

( * ) Notice: Subject to any disclaimer, the term of this patent is extended or adjusted under 35 U.S.C. 154(b) by 331 days.

(21) Appl. No.: 15/942,870

(22) Filed: Apr. 2, 2018

(65) Prior Publication Data

US 2018/0294448 A1   Oct. 11, 2018

Related U.S. Application Data

(63) Continuation of application No. PCT/JP2016/078157, filed on Sep. 26, 2016.

(30) Foreign Application Priority Data

Oct. 2, 2015   (JP) ................................. 2015-197058

(51) Int. Cl.
*H01M 2/10* (2006.01)
*H01R 13/629* (2006.01)
(Continued)

(52) U.S. Cl.
CPC .......... *H01M 2/1016* (2013.01); *H01M 2/10* (2013.01); *H01M 2/20* (2013.01); *H01M 2/202* (2013.01);
(Continued)

(58) Field of Classification Search
None
See application file for complete search history.

(56) References Cited

U.S. PATENT DOCUMENTS

2007/0218780 A1* 9/2007 Onoda ............... H01R 13/4368
439/752
2014/0192457 A1* 7/2014 Zhao ..................... H01R 9/226
361/624
(Continued)

FOREIGN PATENT DOCUMENTS

EP        2871695 A1    5/2015
JP        2011-3433 A   1/2011
(Continued)

OTHER PUBLICATIONS

Extended European Search Report, European Patent Application No. 16851386.9, dated May 13, 2019, 7 pages.
(Continued)

*Primary Examiner* — Rena Dye Cronin
(74) *Attorney, Agent, or Firm* — Barley Snyder

(57) ABSTRACT

An inter-battery connection device for connecting electrode terminals of a plurality of batteries comprises a housing, a bus bar attached to the housing, and a movable member attached to the housing. The bus bar electrically connects two electrode terminals of a pair of batteries adjacent to each other. The bus bar includes a pair of clips each contacting one electrode terminal and a coupling portion connecting the pair of clips. The movable member is movable between a temporary catching position attached to the housing and a final catching position attached to the housing. The movable member has a clip contact avoiding portion preventing contact between one of the clips and the electrode terminal in the temporary catching position and permitting contact between the clip and the electrode terminal during movement from the temporary catching position to the final catching position.

16 Claims, 22 Drawing Sheets

(51) Int. Cl.
*H01R 31/08* (2006.01)
*H01M 2/20* (2006.01)
(52) U.S. Cl.
CPC ........... *H01R 13/629* (2013.01); *H01R 31/08* (2013.01); *H01M 2220/20* (2013.01)

(56) References Cited

U.S. PATENT DOCUMENTS

| | | | | |
|---|---|---|---|---|
| 2014/0248517 A1* | 9/2014 | Yoshioka | ............... | H01M 2/206 429/90 |
| 2015/0222060 A1* | 8/2015 | Kim | ...................... | H01M 2/305 439/675 |
| 2016/0329614 A1* | 11/2016 | Madan | .............. | A61B 17/00234 |
| 2017/0155174 A1* | 6/2017 | Wang | .................. | H01M 10/425 |

FOREIGN PATENT DOCUMENTS

| | | | |
|---|---|---|---|
| JP | 2011-90812 A | 5/2011 |
| JP | 2012-507845 A | 3/2012 |
| JP | 2012-248511 A | 12/2012 |

OTHER PUBLICATIONS

English translation of JP 2011003433A, accessed May 7, 2019, 17 pages (JP 2011003433A previously submitted in IDS filed Apr. 2, 2018).

English translation of JP 2011090812A, accessed May 7, 2019, 20 pages (JP 2011090812A previously submitted in IDS filed Apr. 2, 2018).

\* cited by examiner

INTER-BATTERY CONNECTION DEVICE AND INTER-BATTERY CONNECTION DEVICE ASSEMBLY

CROSS-REFERENCE TO RELATED APPLICATIONS

This application is a continuation of PCT International Application No. PCT/JP2016/078157, filed on Sep. 26, 2016, which claims priority under 35 U.S.C. § 119 to Japanese Patent Application No. 2015-197058, filed on Oct. 2, 2015.

FIELD OF THE INVENTION

The present invention relates to an electrical connection device and, more particularly, to an inter-battery connection device for connecting electrode terminals of batteries adjacent to each other.

BACKGROUND

Thin-plate batteries using lithium ion cells have recently been developed. A battery pack having a relatively large capacity can be constituted compactly by arranging a plurality of batteries of this type adjacent to one another along the thickness of the batteries. The plurality of batteries in the battery pack are electrically connected to one another in series and/or in parallel. The battery pack is used, for example, as a battery for driving an EV (electric vehicle), a HV (hybrid vehicle), or the like.

An inter-battery connection device for arranging and interconnecting a plurality of batteries in parallel is known from Japanese Patent Application No. 2011-90812A. The inter-battery connection device in JP 2011-90812A interconnects a plurality of batteries arranged in parallel which each have electrode terminals protruding from a battery main body. The inter-battery connection device includes a plurality of connectors connected to respective electrode terminals and a circuit board for mounting and holding the plurality of connectors. The circuit board has output wirings electrically connecting the electrode terminals to one another in a desired connection system. Each connector includes contacts, a housing for holding the contacts, and a slider. The contacts have elastic contact pieces protruding from one side of the housing and mounting portions protruding from the other side of the housing, and the housing has a slit for inserting the electrode terminal along the elastic contact pieces and guiding the electrode terminal. The circuit board has passageways at portions corresponding to the electrode terminals, where a housing portion of the connector is mounted to the passageway and the mounting portion is connected to the output wirings.

The elastic contact pieces are pressed and driven to the side of the electrode terminals to be brought into contact with the electrode terminals by moving the slider along the elastic contact pieces. The electrode terminals of batteries adjacent to each other are brought into contact with each other through the connector and the circuit board. The electrode terminals can be thereby be connected to each other without requiring large operation force during connection work between the electrode terminals.

In the inter-battery connection device of JP 2011-90812A, however, the slider for pressing and driving the elastic contact piece of each contact is not attached to the housing of the connector. Therefore, there is a risk that the slider is lost during connection work between the electrode terminals, and connection between the electrode terminals cannot be performed when the slider is lost.

SUMMARY

An inter-battery connection device for connecting electrode terminals of a plurality of batteries comprises a housing, a bus bar attached to the housing, and a movable member attached to the housing. The bus bar electrically connects two electrode terminals of a pair of batteries adjacent to each other. The bus bar includes a pair of clips each contacting one electrode terminal and a coupling portion connecting the pair of clips. The movable member is movable between a temporary catching position attached to the housing and a final catching position attached to the housing. The movable member has a clip contact avoiding portion preventing contact between one of the clips and the electrode terminal in the temporary catching position and permitting contact between the clip and the electrode terminal during movement from the temporary catching position to the final catching position.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
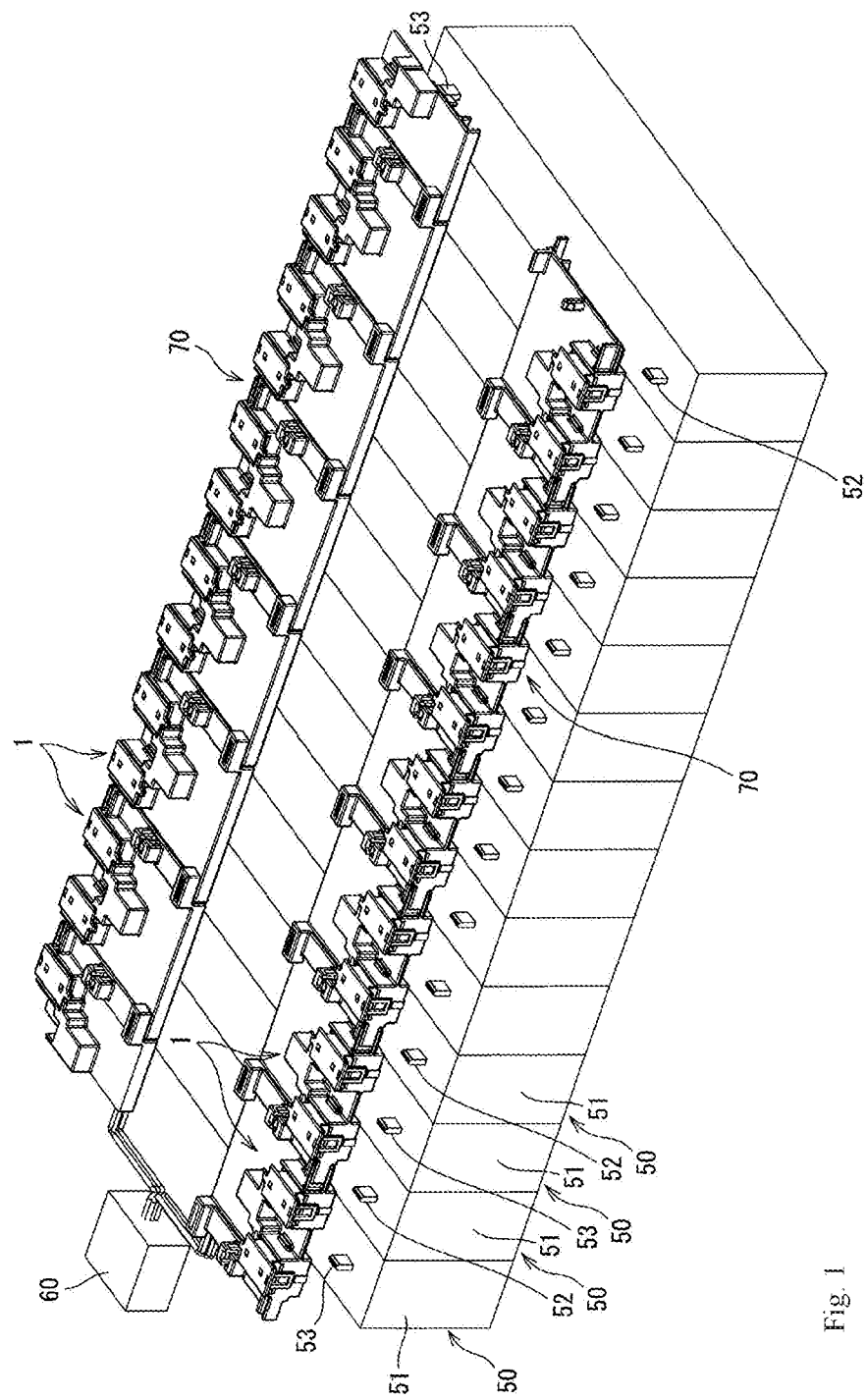
FIG. 1 is a perspective view of a plurality of batteries connected by an inter-battery connection device assembly including a plurality of inter-battery connection devices.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will be thorough and complete and will fully convey the concept of the disclosure to those skilled in the art.

A plurality of batteries 50 electrically connected with an inter-battery connection device assembly 70 according to an embodiment are shown in FIG. 1. The inter-battery connection device assembly 70 includes a plurality of inter-battery connection devices 1

In an embodiment, the batteries 50 are electrically connected to one another in series to constitute a battery pack, and the battery pack is used, for example, in a high-voltage battery for an EV (electric vehicle) or a HV (hybrid vehicle). A first electrode terminal 52 of a battery 50 positioned at a first end of the plurality of batteries 50 electrically connected to one another in series is connected to a second electrode terminal 53 of another battery 50 via a connector 60. Further, a second electrode terminal 53 of a battery 50 positioned at a second end of the plurality of batteries 50 opposite the first end is connected to a controller.

Figure 2:
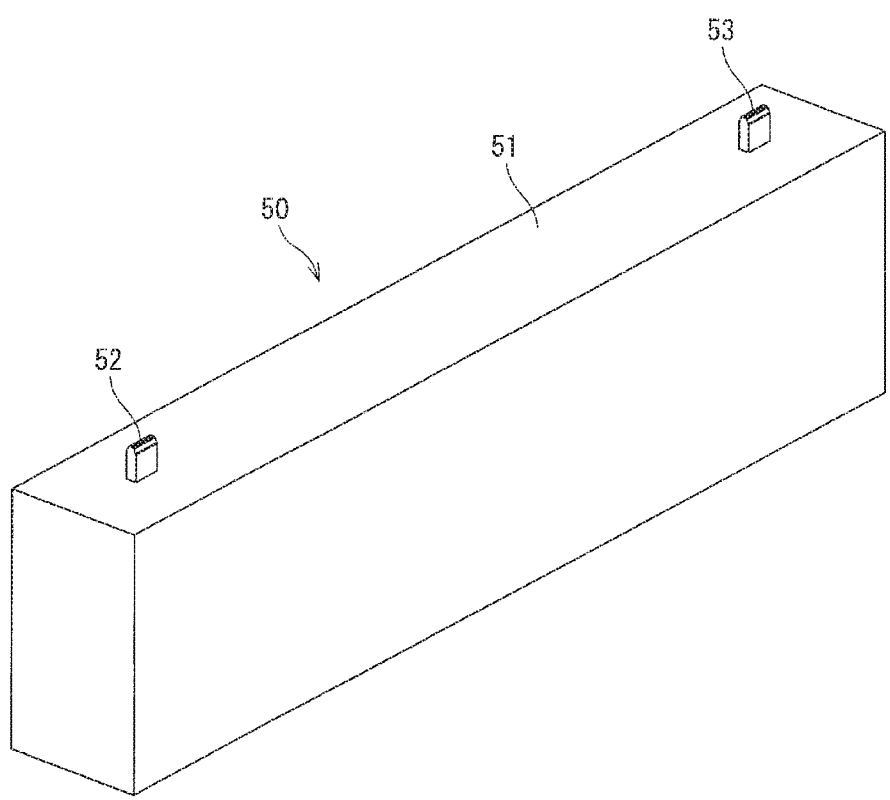
FIG. 2 is a perspective view of a battery of the plurality of batteries.

As shown in FIG. 2, in an embodiment, each battery 50 has a rectangular flat plate-type battery main body 51, the first electrode terminal 52 protrudes from a first side of an upper face of the battery main body 51 and the second electrode terminal 53 protrudes from an opposite second side of the upper face of the battery main body 51. The first electrode terminal 52 and the second electrode terminal 53 are each a male-type tab terminal in the shown embodiment. In an embodiment, the first electrode terminal 52 is a positive electrode and the second electrode terminal 53 is a negative electrode.

Each inter-battery connection device 1, as shown in FIG. 1, connects the first electrode terminal 52 and the second electrode terminal 53 of batteries 50 adjacent to each other. As shown in FIGS. 3-7, each inter-battery connection device 1 has a housing 10, a bus bar 20 attached to the housing 10, and a pair of movable plates 30. In each inter-battery connection device assembly 70, in an embodiment, the plurality of housings 10 in the plurality of inter-battery connection devices 1 may be monolithically formed in a single piece.

Figure 6:
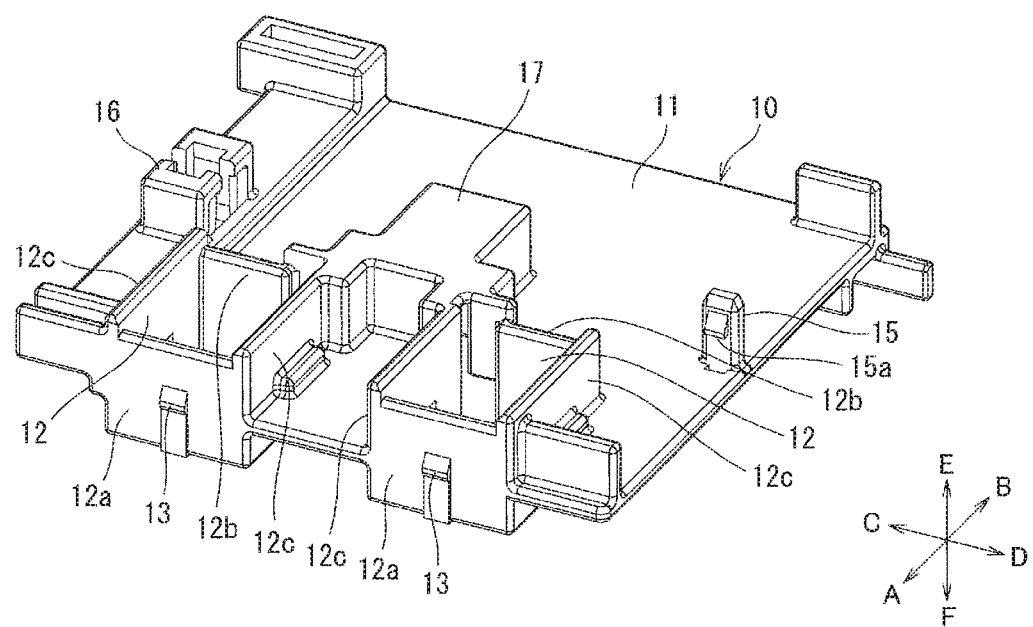
FIG. 6 is a top perspective view of a housing of the inter-battery connection device.
Figure 7:
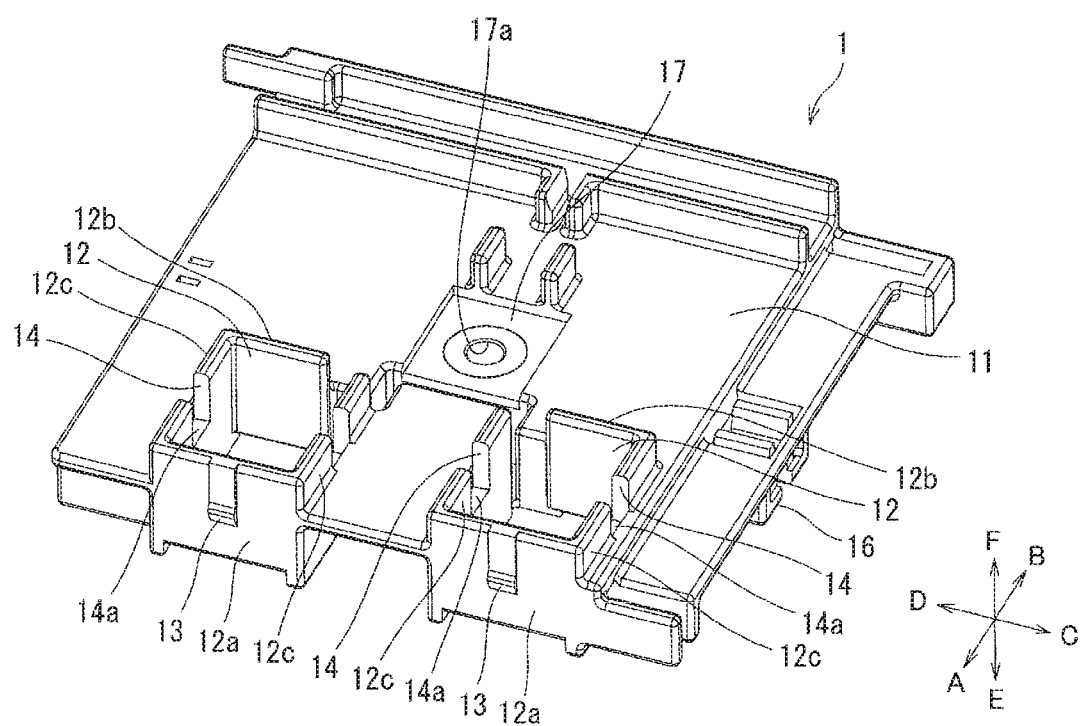
FIG. 7 is a bottom perspective view of the housing of the inter-battery connection device.

As shown in FIGS. 6 and 7, the housing 10 has a housing main body 11. The housing 10 is formed by molding an insulation synthetic resin. The housing main body 11 has an approximately rectangular parallelepiped shape extending in frontward and rearward directions shown by arrows AB, in leftward and rightward directions shown by arrow CD perpendicular to the frontward and backward directions, and in upward and downward directions shown by arrows EF perpendicular to the frontward and backward directions and the leftward and rightward directions. Here, the arrow A shows the frontward direction, the arrow B shows the rearward direction, the arrow C shows the leftward direction, the arrow D shows the rightward direction, the arrow E shows the upward direction, and the arrow F shows the downward direction, and the following description will be made on the basis of these directions.

A pair of left and right clip receiving portions 12 are provided on a front side of the housing main body 11, as shown in FIGS. 6 and 7. Each clip receiving portion 12 is formed in an open-topped and open-bottomed rectangular prismatic shape provided with a front wall 12a, a rear wall 12b, and a pair of left and right side walls 12c coupling the front wall 12a and rear wall 12b. Each clip 21 of the bus bar 20, as described in greater detail below, is received in each clip receiving portion 12.

Figure 15:
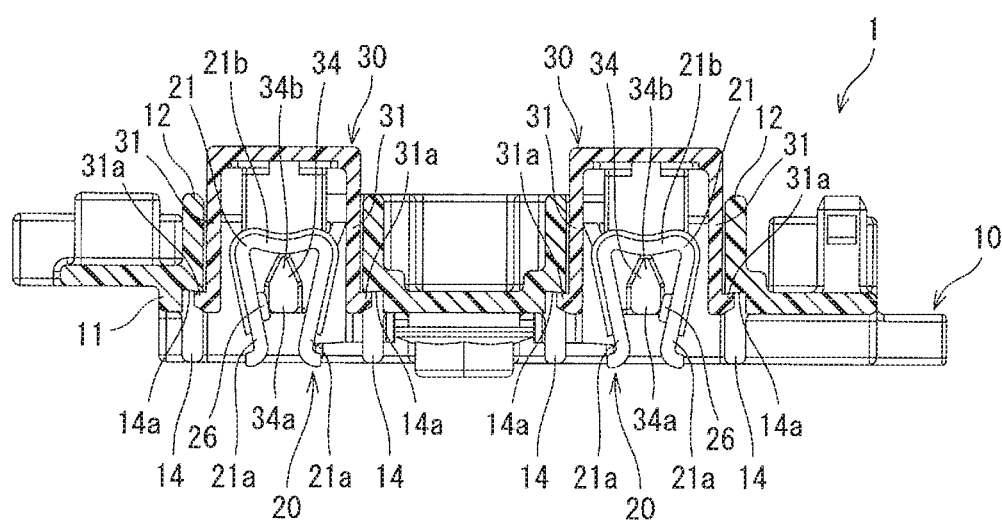
FIG. 15 is another sectional front view of the inter-battery connection device with the movable member in the temporary catching position.

The housing main body 11, as shown in FIGS. 6 and 7, has a catching protrusion 13 provided at an approximately central portion of the front wall 12a of each clip receiving portion 12 in the upward and downward directions. Further, as shown in FIG. 7, a notch 14 extending upwardly from a lower edge of each side wall 12c is formed in each of the side walls 12c of each clip receiving portion 12. As shown in FIG. 15, an upper end of each notch 14 constitutes a movement restraining end 14a for restraining upward movement of a temporary catching protrusion 31a of a temporary catching arm 31 described later of the movable member 30.

Figure 16:
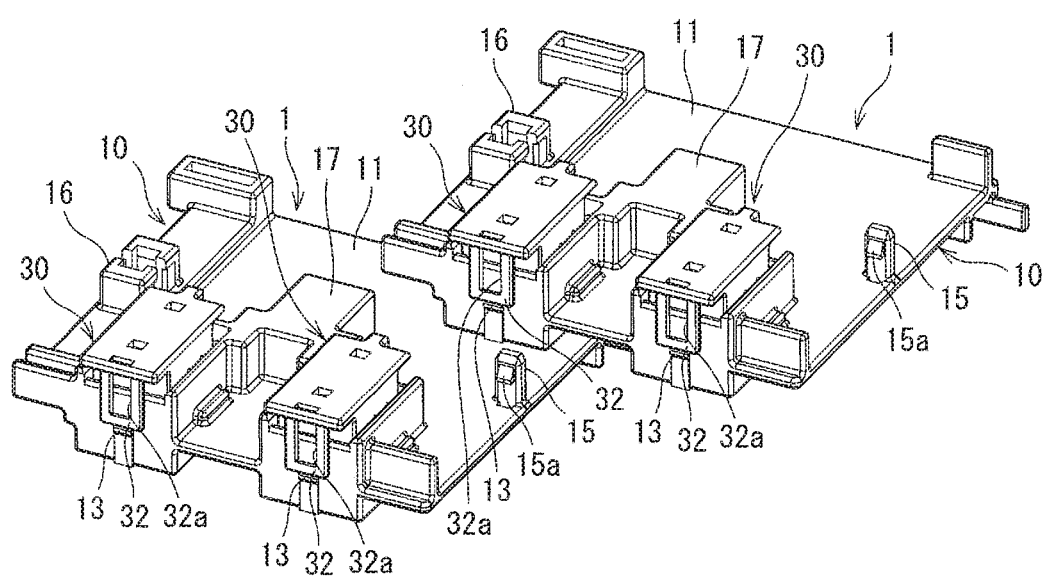
FIG. 16 is a perspective view of a plurality of inter-battery connection devices.

As shown in FIG. 6, a coupling post 15 is provided in the vicinity of an approximately central right edge of the upper face of the housing main body 11 in the frontward and rearward directions and extends in an upright manner, and a coupling post receiving portion 16 is provided in the vicinity of an approximately central left edge of the upper face of the housing main body 11 in the frontward and rearward directions. An engagement protrusion 15a is provided on an upper portion of a front face of the coupling post 15. As shown in FIG. 16, when the inter-battery connection devices 1 adjacent to each other are coupled to each other, the coupling post 15 is positioned in the coupling post receiving portion 16 of the adjacent inter-battery connection device 1 from below. The engagement protrusion 15a engages with the coupling post receiving portion 16, and thereby, the inter-battery connection device 1 and the inter-battery connection device 1 adjacent thereto are coupled to each other.

Figure 4:
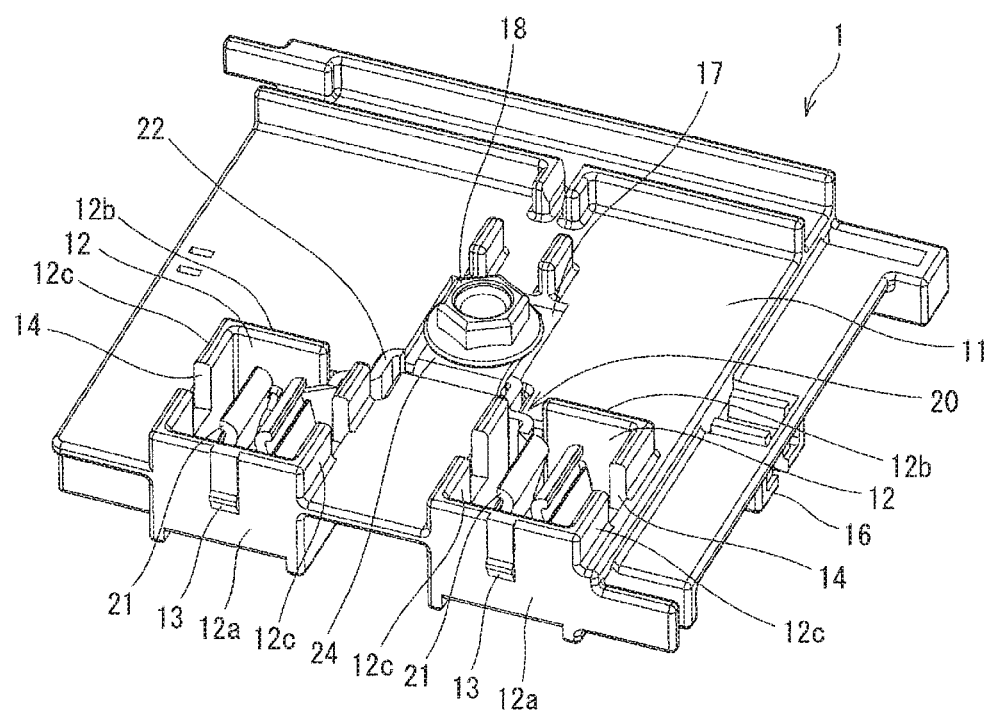
FIG. 4 is a bottom perspective view of the inter-battery connection device.
Figure 5:
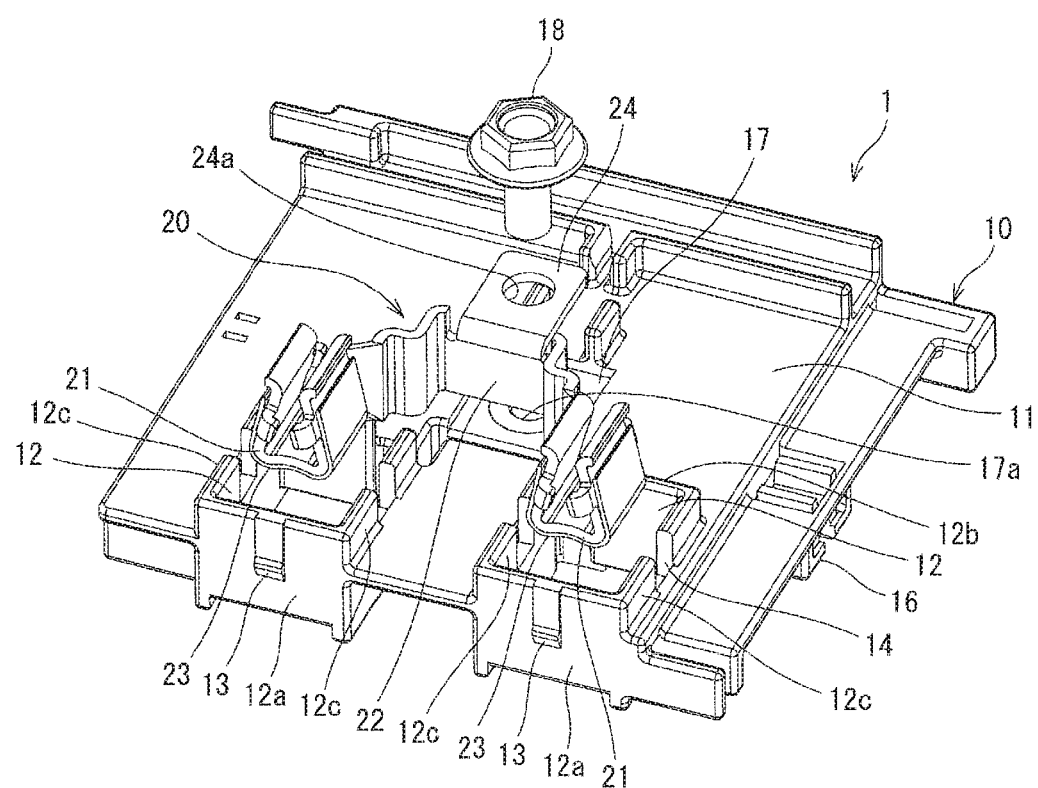
FIG. 5 is a bottom exploded perspective view of the inter-battery connection device.

A bus bar attaching portion 17 is provided at an approximately central portion of the housing main body 11 in the frontward and rearward directions and in the leftward and rightward directions as shown in FIGS. 6 and 7. A female screw portion 17a is formed in the bus bar attaching portion 17. As shown in FIGS. 4 and 5, an attaching plate portion 24 described latter of the bus bar 20 is attached to the bus bar attaching portion 17 by an attaching screw 18.

The bus bar 20 is a conductive metal member for connecting the first electrode terminal 52 and the second electrode terminal 53 of the batteries 50 adjacent to each other. In an embodiment, the bus bar 20 is formed by stamping and forming a conductive metal plate. The bus bar 20 is shown in FIG. 8.

Figure 8:
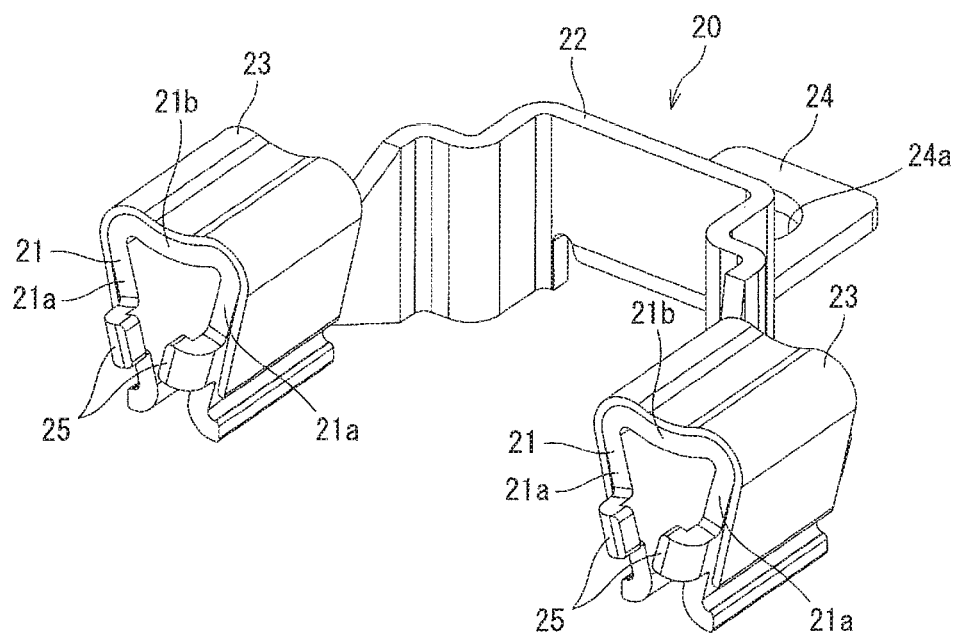
FIG. 8 is a perspective view of a bus bar of the inter-battery connection device.

The bus bar 20, as shown in FIGS. 5 and 8, has two clips 21 for coming into contact with the first electrode terminal 52 and the second electrode terminal 53, respectively, and a coupling portion 22 coupling these clips 21. Each clip 21 has a pair of elastic contact arms 21a and a top plate portion 21b coupling the pair of elastic contact arms 21a. The top plate portion 21b gives elasticity to each elastic contact arm 21a. The pair of elastic contact arms 21a receive and come into contact with one of the first electrode terminal 52 and the second electrode terminal 53 therebetween. In other embodiments, as long as each clip 21 of the bus bar 20 comes into contact with the first electrode terminal 52 or the second electrode terminal 53, it is not necessarily required to be constituted of a pair of elastic contact arms 21a.

The coupling portion 22 couples inner elastic contact arms 21a of the two clips 21 to each other. An attaching plate portion 24 is formed at a lower edge of a central portion of the coupling portion 22. In an embodiment, the attaching plate portion 24 is bent from the coupling portion 22 The attaching plate portion 24 has a passageway 24a into which a screw shaft of the attaching screw 18 is inserted. The bus bar 20 has a reinforcement leaf spring 23 fitted to each clip 21 of the bus bar 20 so as to cover an outer periphery of each clip 21.

Figure 12:
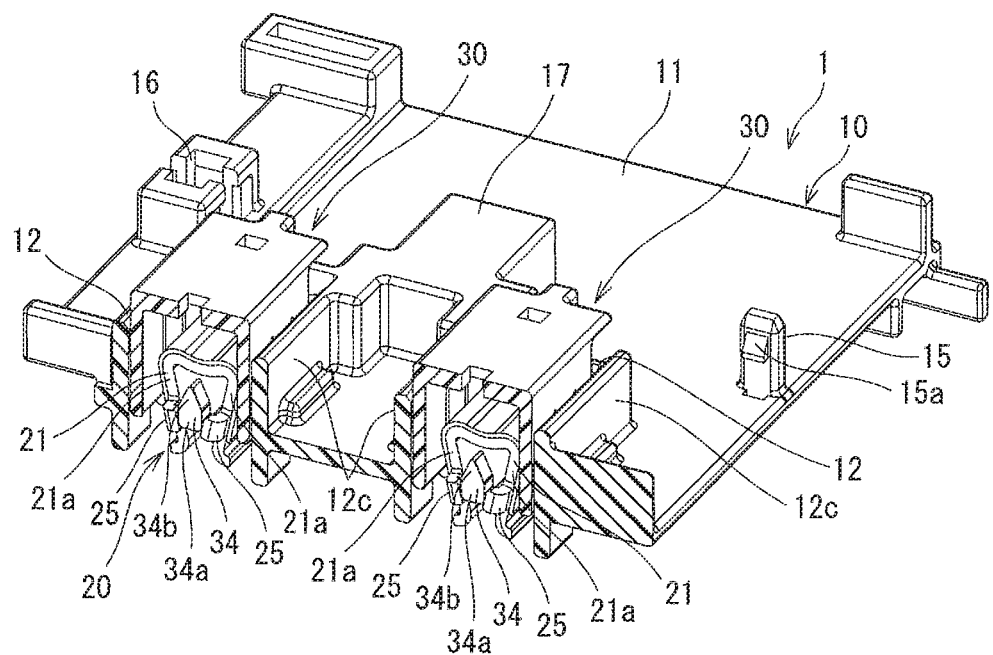
FIG. 12 is a sectional perspective view of the inter-battery connection device with the movable member in a temporary catching position.
Figure 13:
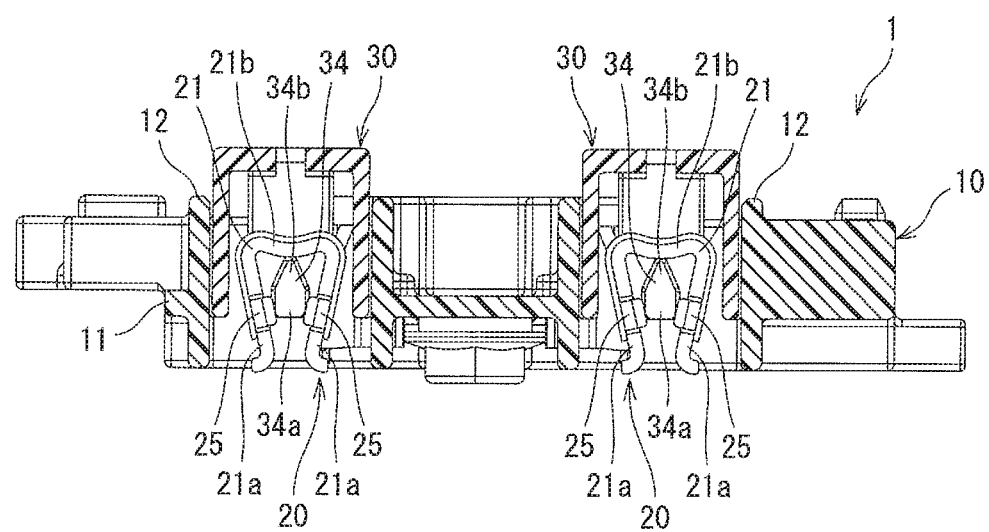
FIG. 13 is a sectional front view of the inter-battery connection device with the movable member in the temporary catching position.

A pair of first engagement protrusions 25 protruding frontward are provided at respective side edges of front sides of the pair of elastic contact arms 21a, as shown in FIG. 8. As shown in FIGS. 12 and 13 and described in greater detail below, a clip contact avoiding portion 34 is positioned between the first engagement protrusions 25 when the movable member 30 is in a temporary catching position. Thereby, a distance between the pair of elastic contact arm 21a is expanded, which results in avoidance of contact of the pair of elastic contact arms 21a with the first electrode terminal 52 or the second electrode terminal 53, as shown in FIG. 20.

Figure 20:
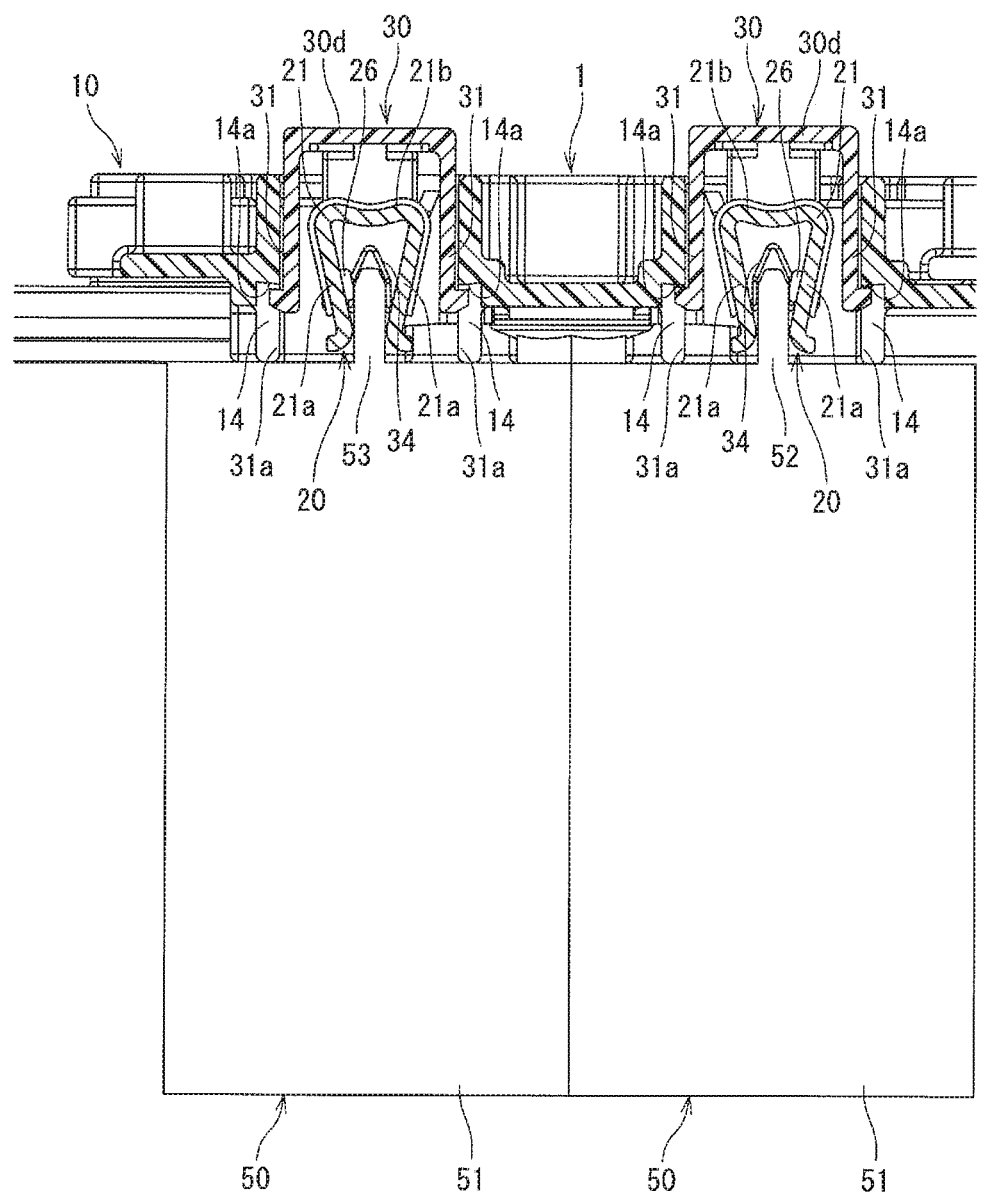
FIG. 20 is an enlarged sectional view of a portion of FIG. 19.

A second engagement protrusion 26 protruding rearward is provided at a side edge of a rear side of an outer elastic contact arm 21a of the pair of elastic contact arms 21a as shown in FIG. 20. When the movable member 30 is in the temporary catching position, as shown in FIG. 15, the clip contact avoiding portion 34 presses the second engagement protrusion 26 outward from inside of the second engagement protrusion 26. Thereby, the outer elastic contact arm 21a is displaced outward to assist expansion of the distance between the pair of elastic contact arms 21a. Then, as shown in FIG. 4 and FIG. 5, the bus bar 20 is attached to the housing 10 by the attaching screw 18 such that each clip 21 is received in each clip receiving portion 12 of the housing 10.

Figure 22:
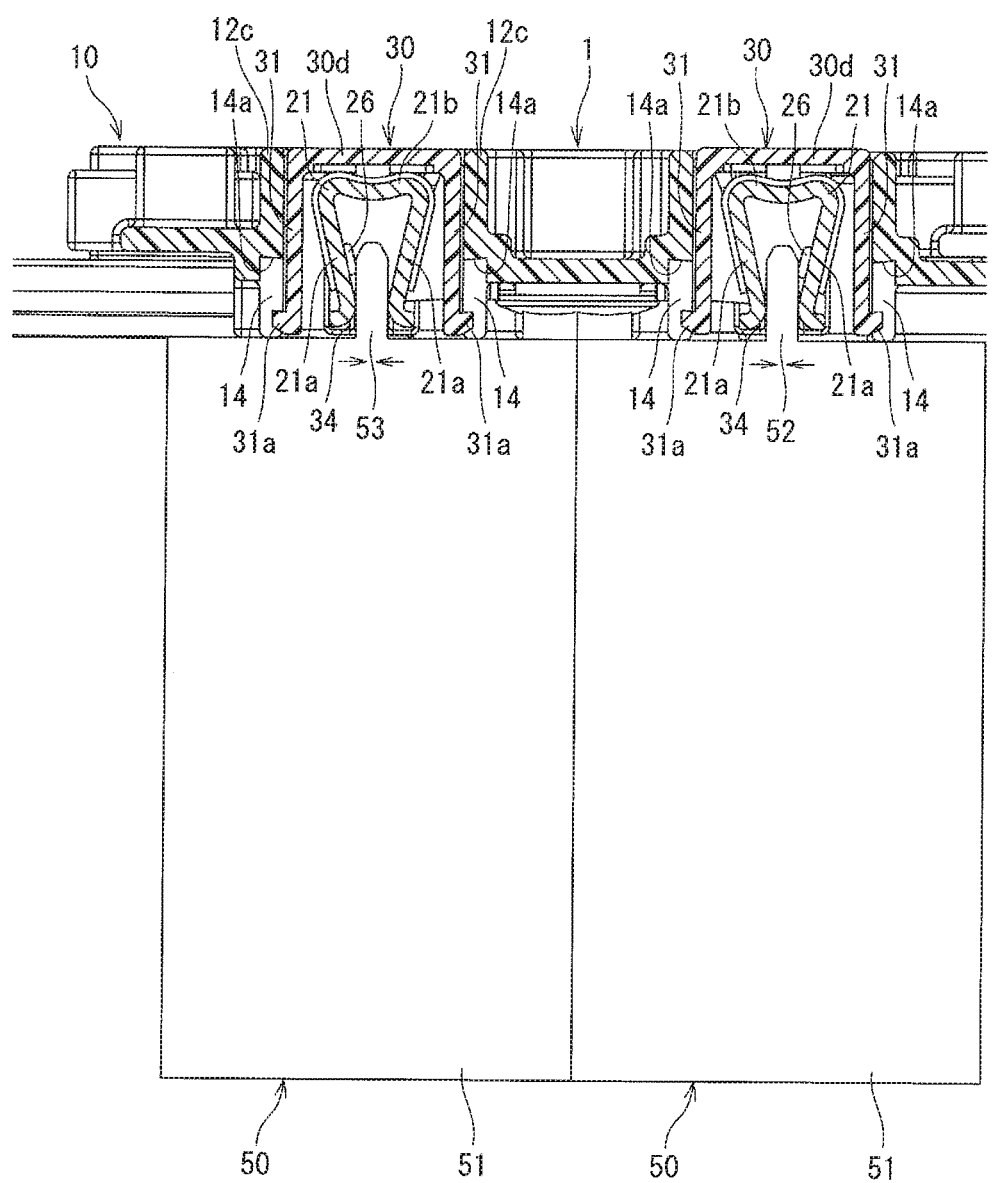
FIG. 22 is an enlarged section view of a portion of FIG. 21.

Each movable member 30 is then attached in each clip receiving portion 12 of the housing 10 so as to be movable between the temporary catching position, shown in FIGS. 3, 12-15, and 20, and a final catching position shown in FIG. 22. Each movable member 30 temporarily catches each clip receiving portion 12 of the housing 10 in the temporary catching position and finally catches each clip receiving portion 12 of the housing 10 in the final catching position. In an embodiment, the two movable plates 30 may be monolithically formed in a single piece.

Figure 3:
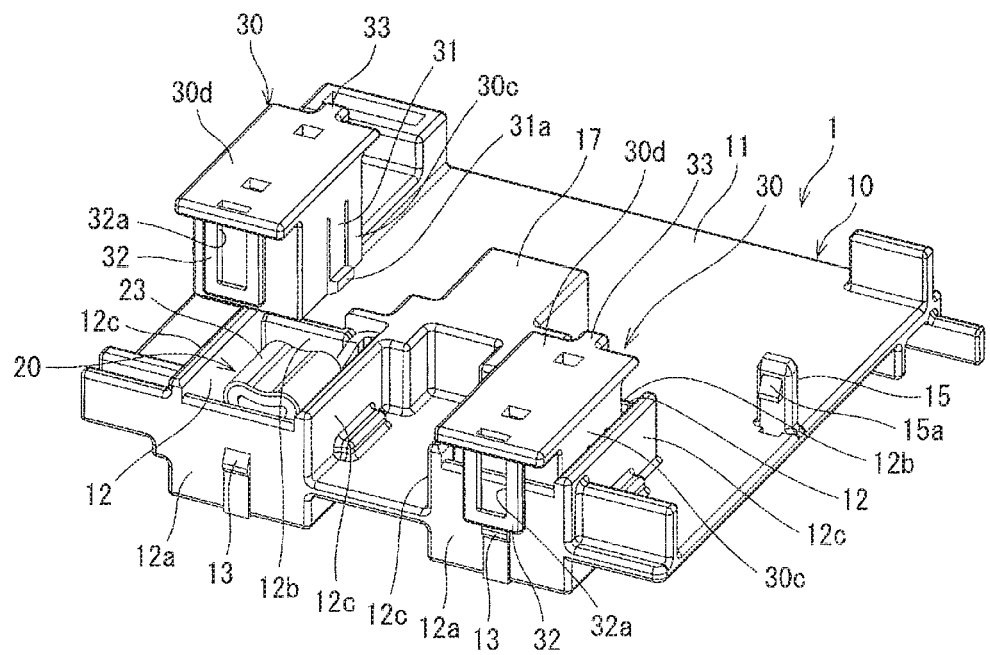
FIG. 3 is a top perspective view of an inter-battery connection device.
Figure 9:
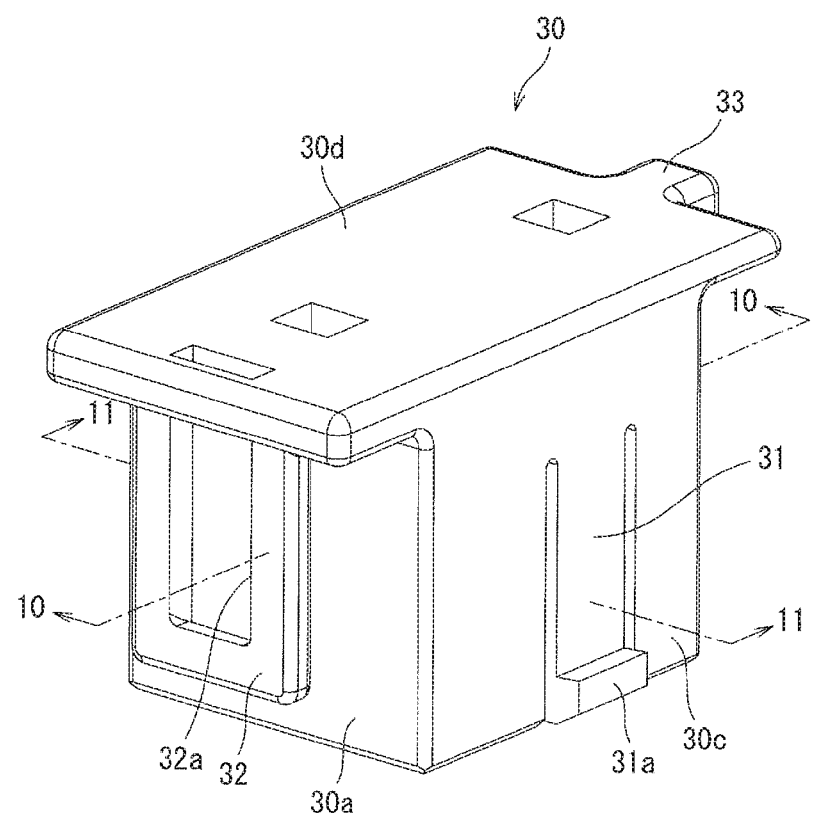
FIG. 9 is a perspective view of a movable member of the inter-battery connection device.
Figure 10:
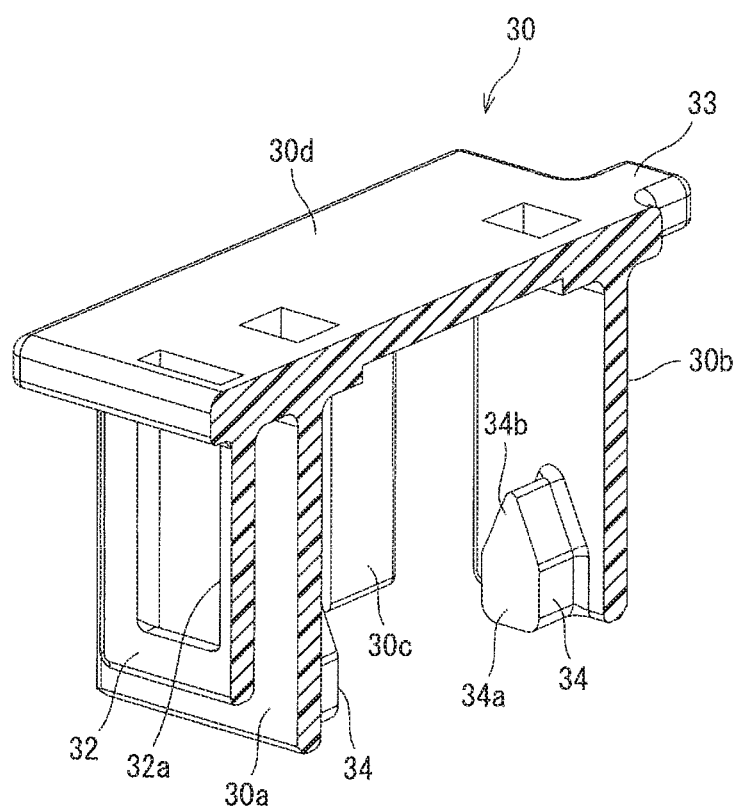
FIG. 10 is a sectional perspective view of the movable member taken along line 10-10 of FIG. 9.
Figure 11:
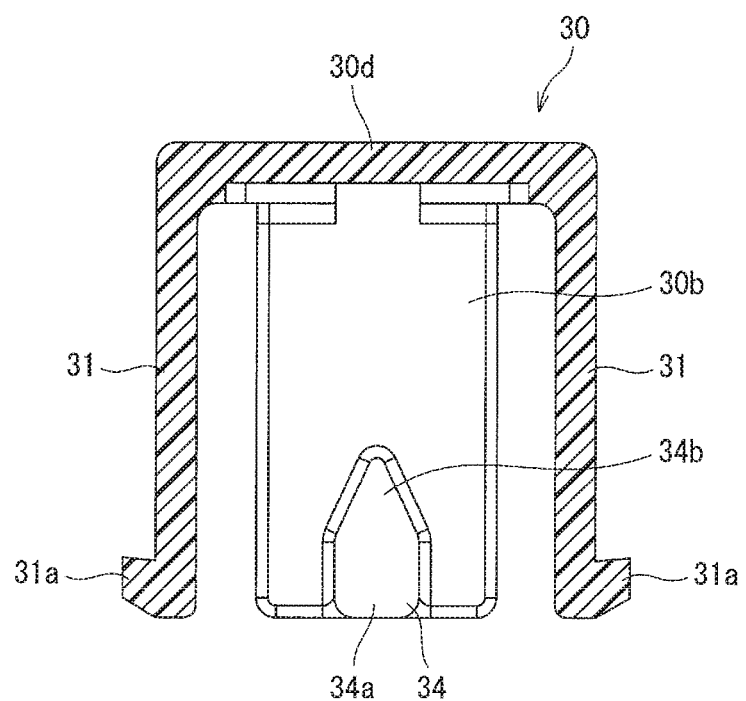
FIG. 11 is a sectional side view of the movable member taken along 11-11 of FIG. 9.

As shown in FIGS. 9-11, each movable member 30 has an approximately rectangular parallelepiped shape having a front wall 30a, a rear wall 30b, a pair of side walls 30c and a top wall 30d. As shown in FIG. 3, the front wall 30a, the rear wall 30b, and the pair of side walls 30c are received in the clip receiving portion 12 so as to be movable in the upward and downward directions. Then, a portion of the top wall 30d protruding forward from the front wall 30a abuts on an upper edge of the front wall 12a of the clip receiving portion 12 and a protrusion portion 33 protruding rearward from the top wall 30d abuts on an upper edge of the rear wall 12b of the clip receiving portion 12, which results in restraint of downward movement of the movable member 30. The heights of the front wall 12a, the rear wall 12b and both the side walls 12c of the clip receiving portion 12 and the thicknesses of the top wall 30d and the protrusion portion 33 of the movable member 30 are set such that upper faces of the front wall 12a, the rear wall 12b and both the side walls 12c of the clip receiving portion 12 are flush with an upper face of the movable member 30.

As shown in FIG. 9, a pair of cantilever-type temporary catching arms 31 having upper ends as fixed ends and capable of displacing in the leftward and rightward directions are provided on both the side walls 30c of the movable member 30, respectively. The temporary catching protrusion 31a protruding outward is disposed at a lower end of each temporary catching arm 31. A final catching arm 32 extending downward is disposed at a portion of the movable member 30 protruding frontward from the front wall 30a. The final catching arm 32 has a final catching hole 32a elongated in the upward and downward directions. In an embodiment, each movable member 30 is formed by molding synthetic resin.

Figure 14:
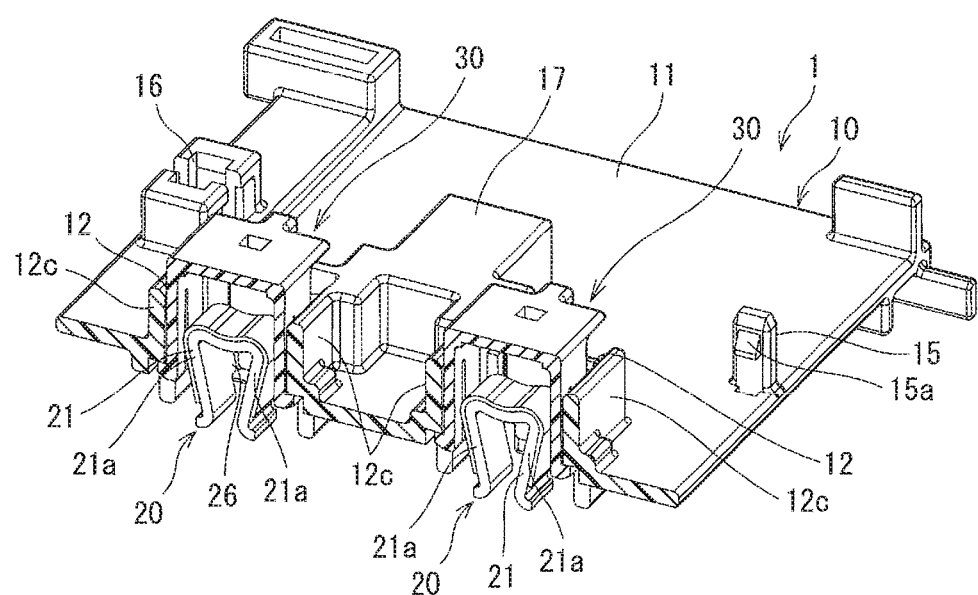
FIG. 14 is another sectional perspective view of the inter-battery connection device with the movable member in the temporary catching position.

When the movable member 30 is received in the clip receiving portion 12 and is in the temporary catching position, as shown in FIG. 3, the lower edge of the final catching arm 32 abuts on the catching protrusion 13 of the clip receiving portion 12. Thereby, downward movement of the movable member 30 is restrained. Further, when the movable member is in the temporary catching position, as shown in FIGS. 14, 15, and 20, the temporary catching protrusion 31a of each temporary catching arm 31 engages with the movement restraining end 14a of the notch 14 formed in each side wall 12c of the clip receiving portion 12. Thereby, upward movement of the movable member 30 is restrained so that the movable member 30 is temporarily caught in the clip receiving portion 12 in the temporary catching position.

When the movable member 30 is in the final catching position, the catching protrusion 13 of the clip receiving portion 12 gets into the final catching hole 32a of the final catching arm 32, which results in restraint of upward movement of the movable member 30. Further, a portion of the top wall 30d of the movable member 30 protruding forward from the front wall 30a abuts on the upper edge of the front wall 12a of the clip receiving portion 12 and the protrusion portion 33 protruding rearward from the top wall 30d abuts on the upper edge of the rear wall 12b of the clip receiving portion 12. Thereby, downward movement of the movable member 30 is restrained so that the movable member 30 is fully caught in the clip receiving portion 12 in the final catching position. As shown in FIG. 22, the upper faces of the front wall 12a, the rear wall 12b and both the side walls 12c of the clip receiving portion 12 are flush with the upper face of the movable member 30.

As shown in FIGS. 10 and 11, a pair of clip contact avoiding portions 34 opposed to each other are provided on respective inner faces of the front wall 30a and the rear wall 30b of each movable member 30. Each clip contact avoiding portion 34 is formed as a protrusion protruding inward from each of the inner faces of the front wall 30a and the rear wall 30b and extending in the upward and downward directions. Each clip contact avoiding portion 34 has an approximately rectangular first avoiding portion 34a located at a lower side of each of the inner face of the front wall 30a and the rear wall 30b and a V-shaped second avoiding portion 34b tapering upward from the first avoiding portion 34a. The width of the first avoiding portion 34a is larger than the plate thickness of the first electrode terminal 52 and the second electrode terminal 53. In other embodiments, the shape of the clip contact avoiding portion 34 is not limited to the illustrated shape provided the clip contact avoiding portion 34 is capable of performing the function described herein.

When the movable member 30 is in the temporary catching position, as shown in FIGS. 12 and 13, the first avoiding portion 34a of the clip contact avoiding portion 34 provided on the front wall 30a is positioned between the first engagement protrusions 25. Thereby, the distance between the pair of the elastic contact arms 21a is expanded, which results in avoidance of contact of the pair of elastic contact arms 21a with the first electrode terminal 52 or the second electrode terminal 53, as shown in FIG. 20. As shown in FIG. 15, the first avoiding portion 34a of the clip contact avoiding portion 34 provided on the rear wall 30b also presses the second engagement protrusion 26 outward from inside. Thereby, the outer elastic contact arm 21a is displaced outward, and expansion of the distance between the pair of the elastic contact arms 21a is assisted.

The first avoiding portion 34a of the clip contact avoiding portion 34 provided on the front wall 30a gets out from between the first engagement protrusions 25 in the course of movement of the movable member 30 from the temporary catching position to the final catching position. The first avoiding portion 34a of the clip contact avoiding portion 34 provided on the rear wall 30b releases the pressing of the second engagement protrusion 26 in the course of movement of the movable member 30 from the temporary catching position to the final catching position. Thereby, the distance between the pair of elastic contact arms 21a is narrowed, which results in contact of the pair of elastic contact arms 21a with the first electrode terminal 52 or the second electrode terminal 53.

The clip contact avoiding portion 34 is not limited to getting into and out from between the pair of first engagement protrusions 25. In other embodiments, the clip contact avoiding portion 34 may get into and out from between the pair of elastic contact arms 21a or a pair of engagement protrusions may be formed on the side edges of the rear sides of the pair of elastic contact arms 21a so that the clip contact avoiding portion 34 gets into and out from between these engagement protrusions.

A method for electrically connecting the plurality of batteries 50 to one another in series using the inter-battery connection device assembly 70 provided with the plurality of the inter-battery connection devices 1 will now be described.

Figure 17:
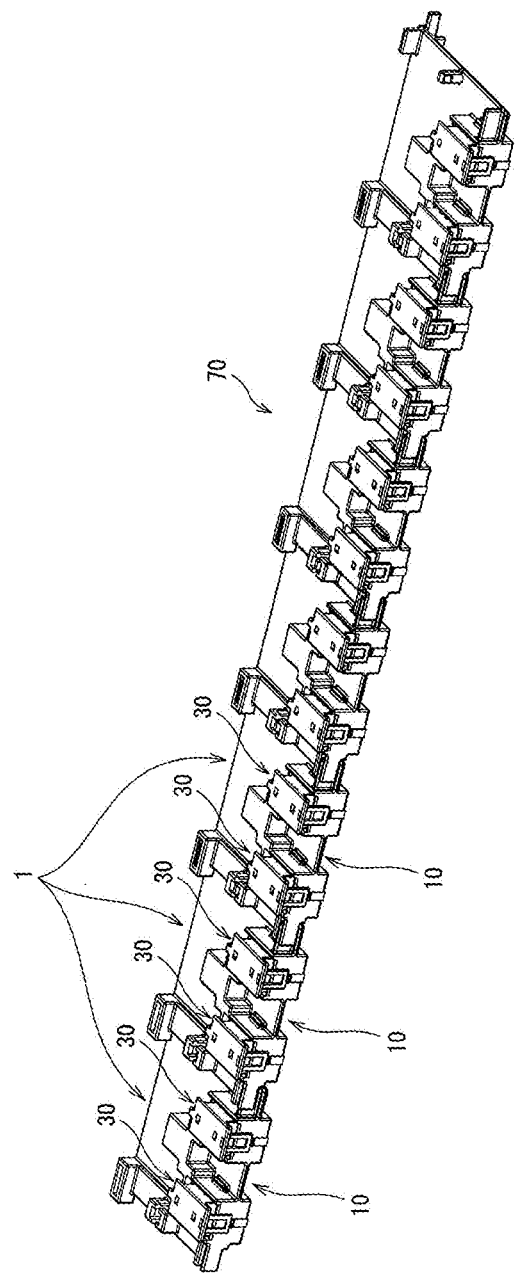
FIG. 17 is a perspective view of an inter-battery connection device assembly.

First, with the movable member 30 of each inter-battery connection device 1 temporarily caught in the temporary catching position as shown in FIG. 16 and FIG. 17, the housings 10 of the inter-battery connection devices 1 adjacent to each other of the plurality of inter-battery connection devices 1 are coupled to each other. Thereby, the inter-battery connection device assembly 70 is completed. In this embodiment, as shown in FIG. 1, two sets of inter-battery connection device assemblies 70 are prepared. When the housings 10 of the inter-battery connection devices 1 adjacent to each other are coupled to each other, the coupling post 15 of the inter-battery connection device 1 is inserted from below into the coupling post receiving portion 16 of the inter-battery connection device 1 adjacent thereto to allow the engagement protrusion 15a to engage with the coupling post receiving portion 16.

Figure 18:
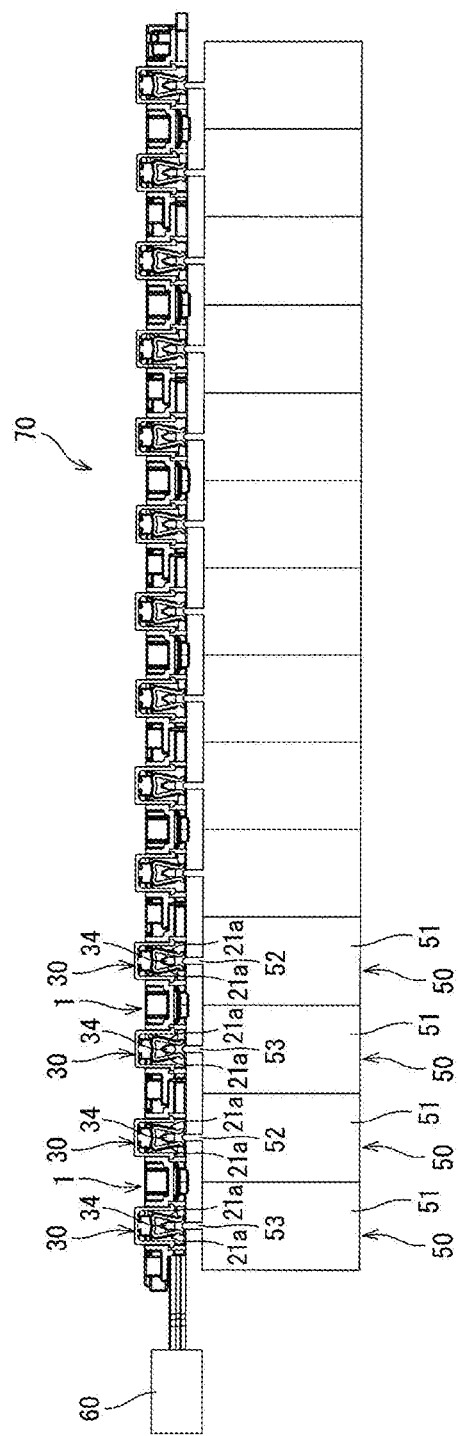
FIG. 18 is a side view of the inter-battery connection device assembly before connection to a terminal of each of the plurality of batteries.
Figure 19:
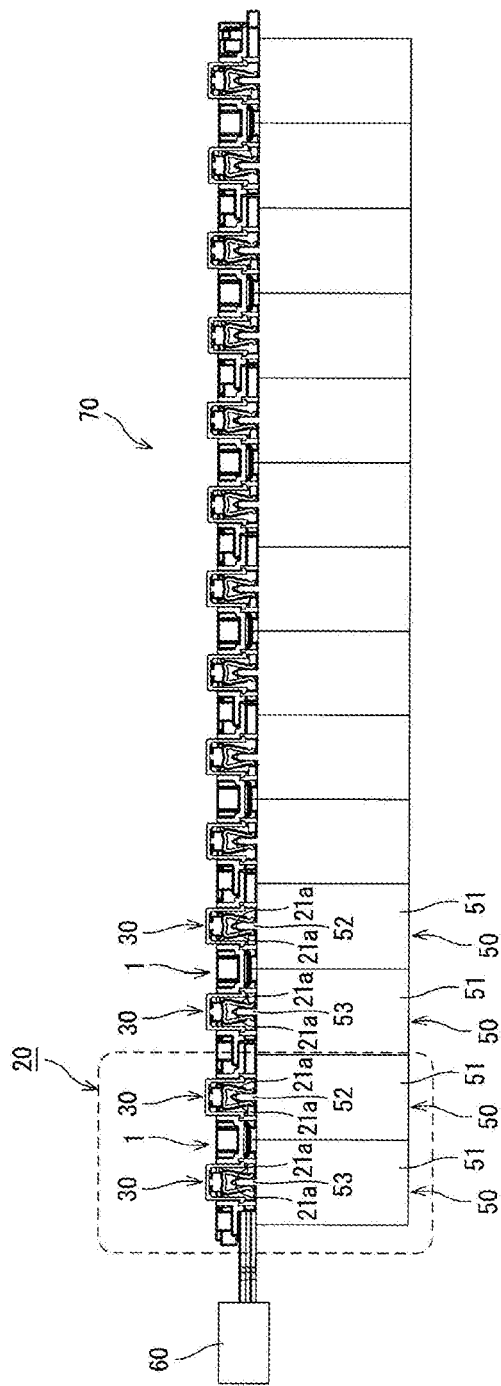
FIG. 19 is a side view of the inter-battery connection device assembly and the plurality of batteries with the movable member of each inter-battery connection device in the temporary catching position.

Next, as shown in FIGS. 18 and 19, each inter-battery connection device assembly 70 is placed on the plurality of batteries 50 such that the first electrode terminal 52 or the second electrode terminal 53 is positioned between the pair of elastic contact arms 21a of each inter-battery connection device 1.

The inter-battery connection device assemblies 70 located on one side, the near side in FIG. 1, will now be described. The second electrode terminal 53 of the battery 50 on the left most end is positioned between one pair of elastic contact arms 21a of the inter-battery connection device 1, and the first electrode terminal 52 of the second battery 50 from the left is positioned between the other pair of elastic contact arms 21a of the leftmost inter-battery connection device 1. Further, the second electrode terminal 53 of the third battery 50 from the left is positioned between one pair of elastic contact arms 21a of the second inter-battery connection device 1 from the left, and the first electrode terminal 52 of the fourth battery 50 from the left is positioned between the other pair of elastic contact arms 21a of the second inter-battery connection device 1. By repeating this, the second electrode terminal 53 of the thirteenth battery 50 from the left is positioned between one pair of elastic contact arms 21a of the seventh inter-battery connection device 1 from the left, and the first electrode terminal 52 of the fourteenth battery 50 from the left is positioned between the other pair of elastic contact arms 21a of the seventh inter-battery connection device 1.

The inter-battery connection device assembly 70 located on the other side, the far side in FIG. 1, will now be described. The second electrode terminal 53 of the second battery 50 from the left is positioned between one pair of elastic contact arms 21a of the inter-battery connection device 1 on the left most end, and the first electrode terminal 52 of the third battery 50 from the left is positioned between the other pair of elastic contact arms 21a of the leftmost inter-battery connection device 1. Further, the second electrode terminal 53 of the fourth battery 50 from the left is positioned between one pair of elastic contact arms 21a of the second inter-battery connection device 1 from the left, and the first electrode terminal 52 of the fifth battery 50 from the left is positioned between the other pair of elastic contact arms 21a of the second inter-battery connection device 1. By repeating this, the second electrode terminal 53 of the twelfth battery 50 from the left is positioned between one pair of elastic contact arms 21a of the sixth inter-battery connection device 1 from the left and the first electrode terminal 52 of the thirteenth battery 50 from the left is positioned between the other pair of elastic contact arms 21a of the sixth inter-battery connection device 1.

When the first electrode terminal 52 or the second electrode terminal 53 is positioned between the pair of elastic contact arms 21a of each inter-battery connection device 1, the movable member 30 of each inter-battery connection device 1 is in the temporary catching position. Therefore, the first avoiding portion 34a of the clip contact avoiding portion 34 is positioned between the first engagement protrusions 25 and the distance between the pair of elastic contact arms 21a is in an expanded state. Therefore, as shown in FIG. 20, the first electrode terminal 52 or the second electrode terminal 53 is inserted into between the pair of elastic contact arms 21a without coming into contact with these elastic contact arms 21a.

Figure 21:
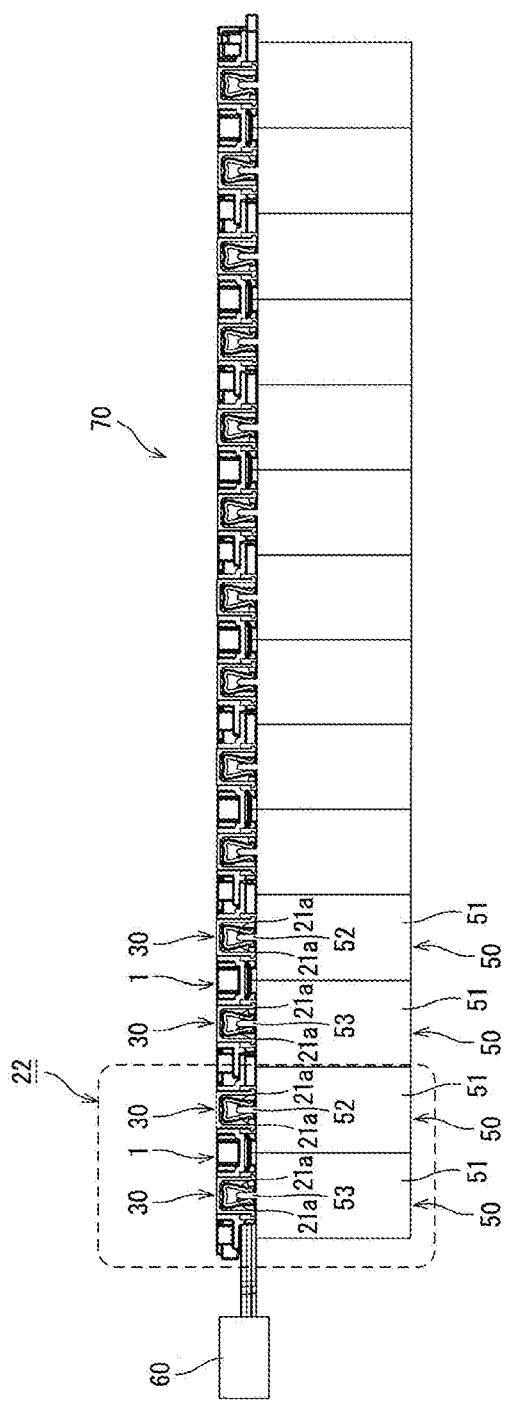
FIG. 21 is a side view of the inter-battery connection device assembly and the plurality of batteries with the movable member of each inter-battery connection device in a final catching position.

Thereafter, as shown in FIG. 21, each movable member 30 is moved downward to be moved from the temporary catching position to the final catching position. At this time, the final catching arm 32 of each movable member 30 gets over the catching protrusion 13 of the housing 10 so that the catching protrusion 13 engages the final catching hole 32a of the final catching arm 32. Here, the first avoiding portion 34a of the clip contact avoiding portion 34 gets out from between the first engagement protrusions 25 in the course of movement of each movable member 30 from the temporary catching position to the final catching position. Thereby, the distance between the pair of elastic contact arms 21a is narrowed, and as shown in FIG. 22, the pair of elastic contact arms 21a come into contact with the first electrode terminal 52 or the second electrode terminal 53. The first electrode terminal 52 of one battery 50 of the batteries 50 adjacent to each other and the second electrode terminal 53 of the other battery 50 are electrically connected to each other via the bus bar 20.

When each movable member 30 is in the temporary catching position, contact of the pair of elastic contact arms 21a of the clip 21 with the first electrode terminal 52 or the second electrode terminal 53 is avoided by the clip contact avoiding portion 34. Then, the clip contact avoiding portion 34 allows the pair of elastic contact arms 21a of the clip 21 to come into contact with the first electrode terminal 52 or the second electrode terminal 53 in the course of moment of each movable member 30 from the temporary catching position to the final catching position. Therefore, connection between the first electrode terminal 52 and the second electrode terminal 53 of the batteries 50 adjacent to each other can be achieved with small operation force.

Each movable member 30 is not only attached to the housing 10 so as to be movable between the temporary catching position and the final catching position, but also temporarily caught on the housing 10 in the temporary catching position, and finally caught on the housing 10 in the final catching position. Therefore, the movable member 30 as an operation part used during connection between the first electrode terminal 52 and the second electrode terminal 53 of the batteries 50 is prevented from being lost. Accordingly, connection between the first electrode terminal 52 and the second electrode terminal 53 of the batteries 50 adjacent to each other can be reliably achieved with small operation force without losing the operation part used during connection between the first electrode terminal 52 and the second electrode terminal 53.

The pair of elastic contact arms 21a of the clip 21 come into contact with the first electrode terminal 52 or the second electrode terminal 53 without sliding thereon, and the clip 21 and the corresponding first electrode terminal 52 or second electrode terminal 53 are prevented from being damaged by the sliding. Further, since movement of the clip contact avoiding portion 34 does not overlap with the first electrode terminal 52 or the second electrode terminal 53 in the upward and downward directions, the clip 21 can be reduced in height. In addition, when the movable member 30 is in the final catching position, as shown in FIG. 22, the upper faces of the front wall 12a, the rear wall 12b and both the side walls 12c of the clip receiving portion 12 are flush with the upper face of the movable member 30. Therefore, a worker can easily recognize that the movable member 30 has reached the final catching position.

What is claimed is:

1. An inter-battery connection device for connecting electrode terminals of a plurality of batteries, comprising:
    a housing;
    a bus bar attached to the housing and electrically connecting two male-type tab electrode terminals of a pair of batteries adjacent to each other, the bus bar including a pair of clips each contacting one electrode terminal and a coupling portion connecting the pair of clips; and
    a movable member movable between a temporary catching position attached to the housing and a final catching position attached to the housing, the movable member having a clip contact avoiding portion including a protrusion having a portion with a width greater than a plate thickness of the tab terminal for preventing contact between one of the clips and the electrode terminal in the temporary catching position and permitting contact between the clip and the electrode terminal during movement from the temporary catching position to the final catching position.

2. The inter-battery connection device of claim 1, wherein the bus bar is a conductive metal member.

3. The inter-battery connection device of claim 2, further comprising a pair of movable members each attached to the housing, and each having a clip contact avoiding portion.

4. The inter-battery connection device of claim 2, wherein each of the clips has a pair of elastic contact arms receiving and contacting the electrode terminal between the pair of elastic contact arms.

5. The inter-battery connection device of claim 4, wherein the clip contact avoiding portion is positioned between the pair of elastic contact arms and expands a distance between the pair of elastic contact arms when the movable member is in the temporary catching position.

6. The inter-battery connection device of claim 5, wherein the clip contact avoiding portion moves out from between the pair of elastic contact arms during movement from the temporary catching position to the final catching position, narrowing the distance between the pair of elastic contact arms.

7. The inter-battery connection device of claim 6, wherein each clip has a pair of engagement protrusions, each engagement protrusion is disposed on side edge of one of the pair of elastic contact arms.

8. The inter-battery connection device of claim 7, wherein the clip contact avoiding portion is positioned between the pair of engagement protrusions and expands a distance between the pair of elastic contact arms when the movable member is in the temporary catching position.

9. The inter-battery connection device of claim 8, wherein the clip contact avoiding portion moves out from between the pair of engagement protrusions during movement from the temporary catching position to the final catching position, narrowing the distance between the pair of elastic contact arms.

10. An inter-battery connection device for connecting electrode terminals of a plurality of batteries comprising:
    a housing;
    a bus bar attached to the housing and electrically connecting two electrode terminals of a pair of batteries adjacent to each other, the bus bar including a pair of clips each contacting one electrode terminal and a coupling portion connecting the pair of clips; and
    a movable member movable between a temporary catching position attached to the housing and a final catching position attached to the housing, the movable member having a clip contact avoiding portion preventing contact between one of the clips and the electrode terminal in the temporary catching position and permitting contact between the clip and the electrode terminal during movement from the temporary catching position to the final catching position,
    wherein the movable member has a pair of cantilever-type temporary catching arms and a final catching arm.

11. The inter-battery connection device of claim 10, wherein the electrode terminal is a male-type tab terminal.

12. The inter-battery connection device of claim 11, wherein the clip contact avoiding portion is a protrusion and includes a portion having a width greater than a plate thickness of the tab terminal.

13. The inter-battery connection device of claim 10, wherein a lower edge of the final catching arm abuts the housing and the cantilever-type temporary catching arms engage the housing in the temporary catching position.

14. The inter-battery connection device of claim 13, wherein the final catching arm engages the housing in the final catching position.

15. An inter-battery connection assembly for connecting electrode terminals of a plurality of batteries, comprising:
- a plurality of inter-battery connection devices, each inter-battery connection device including:
- a housing, the housings of inter-battery connection devices adjacent to each other are coupled to each other;
- a bus bar attached to the housing and electrically connecting two male-type tab electrode terminals of a pair of batteries adjacent to each other, the bus bar including a pair of clips each contacting one electrode terminal and a coupling portion connecting the pair of clips; and
- a movable member movable between a temporary catching position attached to the housing and a final catching position attached to the housing, the movable member having a clip contact avoiding portion including a protrusion having a portion with a width greater than a plate thickness of the tab terminal for preventing contact between one of the clips and the electrode terminal in the temporary catching position and permitting contact between the clip and the electrode terminal during movement from the temporary catching position to the final catching position.

16. The inter-battery connection assembly of claim 15, wherein the housings of a plurality of inter-battery connections devices are monolithically formed in a single piece.

* * * * *